United States Patent [19]

Asada

[11] Patent Number: 5,251,513

[45] Date of Patent: Oct. 12, 1993

[54] ADAPTIVE SELF-ADJUSTMENT OF AUTOMATIC TRANSMISSION TO INPUT TORQUE CHANGE DUE TO AUXILIARY DEVICE

[75] Inventor: Michio Asada, Shizuoka, Japan

[73] Assignee: Jatco Corporation, Japan

[21] Appl. No.: 12,806

[22] Filed: Feb. 2, 1993

Related U.S. Application Data

[63] Continuation of Ser. No. 722,191, Jun. 27, 1991.

[30] Foreign Application Priority Data

Jun. 28, 1990 [JP] Japan .................................. 2-171043

[51] Int. Cl.$^5$ .............................................. F16H 11/02
[52] U.S. Cl. ........................................ 74/866; 74/856
[58] Field of Search ................... 74/856, 857, 861, 865, 74/866

[56] References Cited

U.S. PATENT DOCUMENTS

| | | | |
|---|---|---|---|
| 3,709,066 | 1/1973 | Burcz | 74/869 X |
| 4,559,850 | 12/1985 | Sakakibara | 74/866 X |
| 4,730,521 | 3/1988 | Hayasaki et al. | 74/867 |
| 4,807,496 | 2/1989 | Hayasaki et al. | 74/866 |
| 4,845,618 | 7/1989 | Narita | 74/866 X |
| 4,846,021 | 7/1989 | Hamano et al. | 74/866 |
| 4,850,935 | 7/1989 | Morimoto | 74/866 X |

FOREIGN PATENT DOCUMENTS 58-34258  2/1983  Japan .

Primary Examiner—Allan D. Herrmann
Assistant Examiner—William O. Trousell
Attorney, Agent, or Firm—Ronald P. Kananen

[57] ABSTRACT

An engine driven auxiliary device consumes engine power and thus reduces the amount of torque supplied to an automatic transmission. In the automatic transmission, a line pressure control and/or a shift control is performed on a predetermined parameter that is employed as reflecting an instantaneous amount of engine torque supplied to the automatic transmission. There occurs a deviation of this predetermined parameter from the actual amount of torque supplied to the automatic transmission when the auxiliary device is in operation. Thus, a sensor output of a throttle opening degree sensor is corrected when the auxiliary device is in operation and then set as the predetermined parameter although the sensor output unaltered is set as the predetermined parameter when the auxiliary device is not in operation.

3 Claims, 5 Drawing Sheets

FIG. 2

| | | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|---|
| D RANGE | 1ST. SPEED | | | ○ | | | | ○ | ○ | $\dfrac{1+\alpha_2}{\alpha_2}$ | 3.027 |
| | 2ND. SPEED | | ○ | ○ | | ○ | | ○ | | $\dfrac{\alpha_1+\alpha_2+\alpha_1\alpha_2}{\alpha_2(1+\alpha_1)}$ | 1.619 |
| | 3RD. SPEED | | ○ | ○ | ○ | | | ○ | | 1 | 1.000 |
| | 4TH. SPEED | | | (○) | ○ | ○ | | | | $\dfrac{1}{1+\alpha_1}$ | 0.694 |
| ENGINE BRAKE RUNNING STATE | 1ST. SPEED | | ○ | (○) | ○ | | | (○) | (○) | | |
| | 2ND. SPEED | | ○ | (○) | ○ | ○ | | (○) | | | |
| | 3RD. SPEED | | ○ | (○) | ○ | | | (○) | | | |
| | 4TH. SPEED | | | (○) | | ○ | | | | | |
| REVERSE | | ○ | | | | | ○ | | | $-\dfrac{1}{\alpha_1}$ | -2.272 |

( ) UNRELATED TO POWER TRANSMISSION

1

ADAPTIVE SELF-ADJUSTMENT OF AUTOMATIC TRANSMISSION TO INPUT TORQUE CHANGE DUE TO AUXILIARY DEVICE

RELATED APPLICATIONS

This application is a continuation of application Ser. No. 07/722,191 filed Jun. 27, 1991.

U.S. patent application Ser. No. 07/718,652 filed Jun. 21, 1991, entitled "LINE PRESSURE CONTROL FOR AUTOMATIC TRANSMISSION", claiming priority on Japanese Patent Application No. 2-164938 which was filed in Japan on Jun. 22, 1990 now U.S. Pat. No. 5,111,718, issued on May 12, 1992.

BACKGROUND OF THE INVENTION

The present invention relates to a control for an automatic transmission, and more particularly to an adaptive self-adjustment of an automatic transmission to change an amount of input torque owing to operation of an engine driven auxiliary device.

Japanese Patent Application First (unexamined) Publication No. 58-34258 discloses a control for an automatic transmission wherein a gear shift is controlled in response to the output signals of a throttle opening degree sensor and a vehicle speed sensor and a line pressure used for actuating hydraulically actuable frictionally engageable couplings is varied in the same pattern as actual engine torque varies. For this line pressure control, a throttle valve which is operatively coupled via a cam with the engine throttle valve is provided. Specifically, with the same throttle opening, the same amount of line pressure is produced.

According to this known line pressure control, the amount of line pressure becomes higher than necessary for the actually supplied torque to the automatic transmission when an auxiliary device is in operation to consume the engine power output and reduce the amount of actually supplied torque to the automatic transmission.

An object of the present invention is to provide a control for an adaptive self-adjustment of an automatic transmission to a change in actual input torque in response to an operation of an auxiliary device.

SUMMARY OF THE INVENTION

According to one aspect of the present invention, there is provided a method of an adaptive self-adjustment of an automatic transmission of an automotive vehicle having an engine and an auxiliary device which consumes the engine power output and reduces the amount of the engine torque supplied to the automatic transmission, the automatic transmission being variable in state in a predetermined pattern versus a predetermined parameter, the method comprising the steps of:

detecting a power demand on the engine and generating a power demand indicative signal indicative of said power demand detected;

detecting whether the auxiliary device is in operation or not and generating an auxiliary device in-operation indicative signal when it is detected that the auxiliary device is in operation; and deriving the predetermined parameter from said power demand indicative signal such that said power demand indicative signal is set as said predetermined parameter in response to an absence of said auxiliary device in-operation indicative signal and said power demand indicative signal is corrected and set as said predetermined parameter in response to a presence of said auxiliary device in-operation indicative signal.

According to another aspect of the present invention, there is provided a system for an adaptive self-adjustment of an automatic transmission of an automotive vehicle having an engine and an auxiliary device which consumes the engine power output and reduces the amount of the engine torque supplied to the automatic transmission, the automatic transmission being variable in state in a predetermined pattern versus a predetermined parameter, the system comprising:

means for detecting a power demand on the engine and generating a power demand indicative signal indicative of said power demand detected;

means for detecting whether the auxiliary device is in operation or not and generating an auxiliary device in-operation indicative signal when it is detected that the auxiliary device is in operation; and means for deriving the predetermined parameter from said power demand indicative signal such that said power demand indicative signal is set as said predetermined parameter in response to an absence of said auxiliary device in-operation indicative signal and said power demand indicative signal is corrected and set as said predetermined parameter in response to a presence of said auxiliary device in-operation indicative signal.

BRIEF DESCRIPTION OF THE DRAWINGS

FIG. 2 is a table illustrating which one or ones of frictionally engageable couplings are actuated in each of speeds;

DETAILED DESCRIPTION OF THE INVENTION

Figure 1:
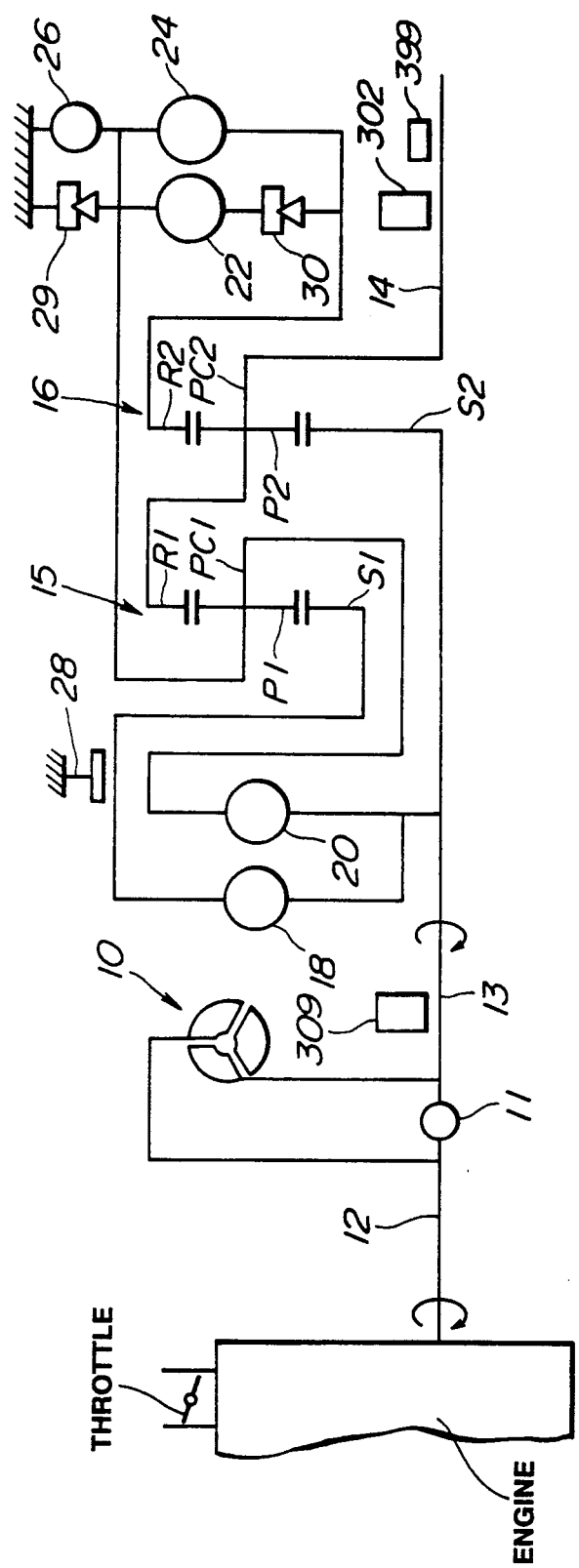
FIG. 1 is a schematic diagram of an automatic stepwise operable transmission coupled with an engine of an automotive vehicle.

Referring to FIG. 1, an automatic stepwise operable transmission is drivingly coupled with a torque converter 10 which is in turn drivingly coupled with an output shaft 12 of an engine of an automotive vehicle. The engine has a throttle valve which opens in degrees. The automatic transmission provides four forward speeds with an overdrive and a single reverse. The transmission includes an input shaft 13 connected to a turbine runner of the torque converter 10, and an output shaft 14 connected to a final drive gear assembly, not illustrated. It also includes a first planetary gear set 15, a second planetary gear set 16, a reverse clutch 18, a high clutch 20, a forward clutch 22, an overrunning clutch 24, a low and reverse brake 26, a band brake 28, a low one-way clutch 29, and a forward one-way clutch 30. The torque converter 10 includes therein a lock-up clutch 11. The first planetary gear set 15 comprises a sun gear S1, a ring gear R1, and a pinion carrier PC1 rotatably supporting pinion gears P1, each meshing both the sun and ring gears S1 and R1. The planetary gear set 16 comprises a sun gear S2, a ring gear R2, and a pinion carrier PC2 rotatably supporting pinion gears P2, each meshing both the sun and ring gears S2 and R2. The carrier PC1 is connectable to the input shaft 13 via the high clutch 20, while the sun gear S1 is connectable to the input shaft 13 via the reverse clutch 18. The carrier PC1 is connectable to the ring gear R2 via the forward clutch 22 and the forward one-way clutch 30 arranged in series with the forward clutch 22 or via the overrunning clutch 24 arranged in parallel to both the forward clutch 22 and forward one-way clutch 30. The sun gear S2 is connected to the input shaft 13, while the ring gear R1 and the carrier PC2 are constantly connected to the output shaft 14. The low & reverse brake 26 is arranged to hold the carrier PC1 stationary, while the band brake 28 is arranged to hold the sun gear S1 stationary. The low one-way clutch 29 is arranged to allow a rotation of the pinion carrier PC1 in a forward direction (the same direction as a direction in which the engine shaft 12 rotates), but preventing a rotation in the opposite reverse direction.

In this transmission, rotation states of various rotary elements (S1, S2, R1, R2, PC1, and PC2) of planetary gear sets 15 and 16 are varied by actuating the hydraulically actuable and frictionally engageable couplings, namely, the clutches 18, 20, 22, 24, and brakes 26, 28, in different kinds of combinations, thereby to vary a ration, i.e., a gear ratio, of a revolution speed of the input shaft 13 to a revolution speed of the output shaft 14. Four forward speeds and a single reverse speed are provided by actuating the clutches 18, 20, 22, and 24, and the brakes 26 and 28 in various combinations as shown in FIG. 2. In FIG. 2, the sign ◯ (circle) denotes that a particular coupling to which it is assigned to is actuated or engaged, the signs α1 (alpha one) and α2 (alpha two) designate a ratio of number of teeth of the ring gear R1 to that of the sun gear S1 and a ratio of number of teeth of the ring gear R2 to that of the sun gear S2.

Figure 3:
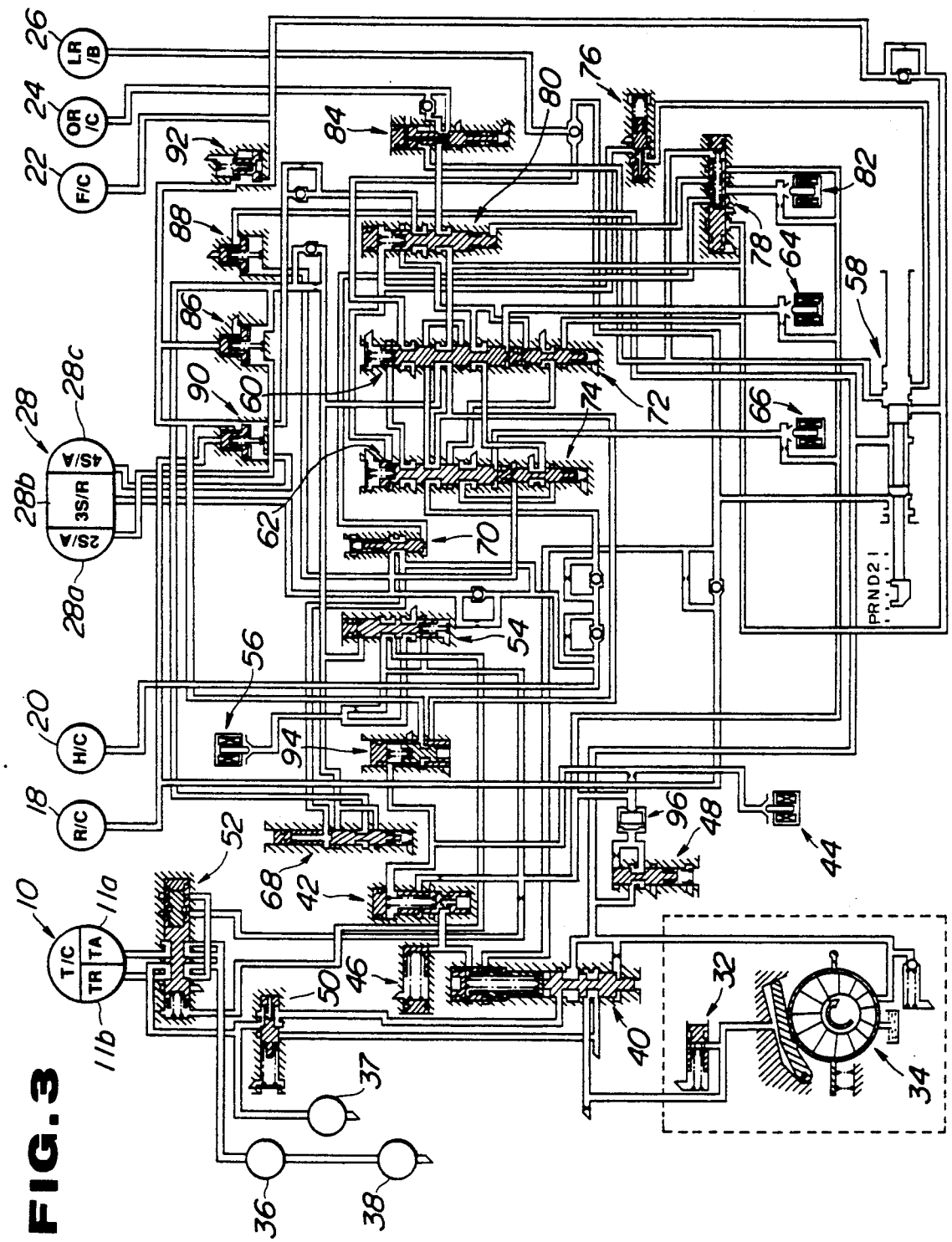
FIG. 3 is a circuit diagram of a hydraulic control system of the automatic transmission.

FIG. 3 shows a hydraulic control system of the transmission. This hydraulic control system comprises a pressure regulator valve 40, a pressure modifier valve 42, a line pressure solenoid 44, a modifier pressure accumulator 46, a pilot valve 48, a torque converter relief valve 50, a lock-up control valve 52, a first shuttle valve 54, a lock-up solenoid 56, a manual valve 58, a first shift valve 60, a second shift valve 62, a first shift solenoid 64, a second shift solenoid 66, a servo charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid 82, an overrunning clutch reducing valve 84, a 1-2 accumulator 86, a 2-3 accumulator 88, a 3-4 accumulator 90, a N-D accumulator 92, an accumulator control valve 94, and a filter 96. These components are interconnected as illustrated. As illustrated, they are connected also to the before-mentioned torque converter (the torque converter 10 includes an apply chamber 11a and a release chamber 11b for the lock-up clutch 11), the forward clutch 22, the high clutch 20, the band brake 28 (the band brake 28 including a second speed apply chamber 28a, a third speed release chamber 28b, and a fourth speed apply chamber 28c), the reverse clutch 18, the low and reverse brake 26, and the overrunning clutch 24. They are connected also to the variable capacity vane type oil pump 34, the oil cooler 36, the forward lubrication circuit 37, and the rear lubrication circuit 38 as illustrated. The detailed description of these valves is hereby omitted. The automatic transmission thus far briefly described is substantially the same as an automatic transmission of RE4R-01A type which is manufactured by Nissan Motor Company Limited in Japan. The automatic transmission of the RE4R01A type is described in a service manual (publication No. A261C07) entitled "NISSAN FULL RANGE ELECTRONICALLY CONTROLLED AUTOMATIC TRANSMISSION RE4R01A TYPE" published by Nissan Motor Company Limited in March, 1987. U.S. Pat. No. 4,730,521 issued to Hayasaki et al. in Mar. 15, 1989 discloses the automatic transmission of the RE4R01A type. Thus, reference is made to the above-mentioned service manual and the U.S. Pat. No. 4,730,521 for full understanding of the automatic transmission of this type. In this automatic transmission, the magnitude of a line or system pressure is controllable by the line pressure solenoid 44. The manner of controlling the magnitude of the line pressure is described on pages I-22 to I-24 of the above-mentioned service manual. Reference is made to claims 1 to 7 of U.S. Pat. No. 4,807,496 issued to Hayasaki et al on Feb. 28, 1989 for understanding features of the line pressure control.

Figure 4:
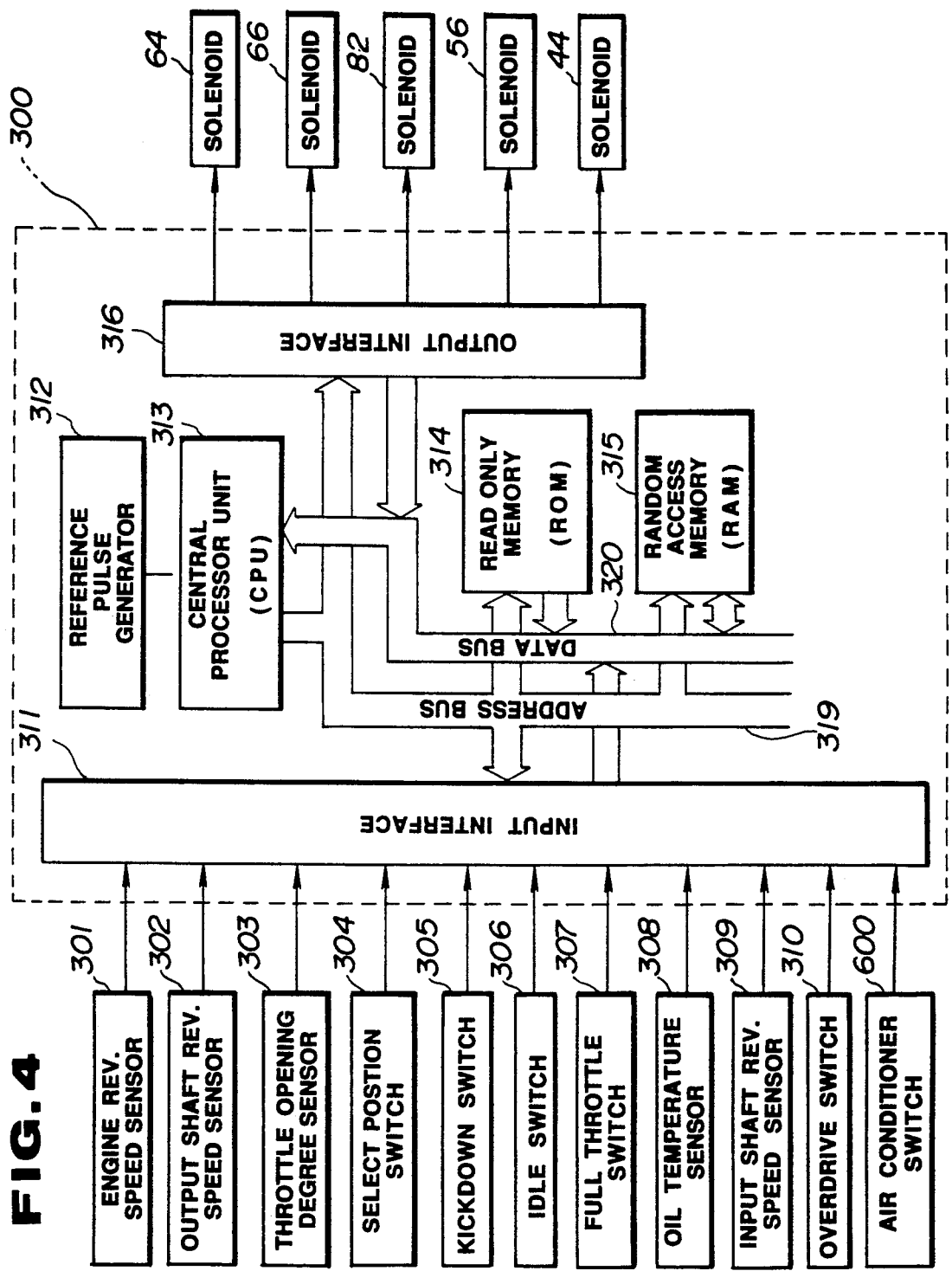
FIG. 4 is a block diagram of an automatic transmission control unit.

FIG. 4 shows an automatic transmission control unit 300 which controls the solenoids 44, 56, 64, 66 and 82. The control unit 300 comprises an input interface 311, a reference pulse generator 312, a CPU (a central processor unit) 313, a ROM (a read only memory) 314, a RAM (a random access memory) 315, and an output interface 316. They are interconnected by an address bus 319, and a data bus 320. Fed to this control unit 300 are output signals of an engine revolution speed sensor 301, an output shaft revolution speed sensor 301, an output shaft 302, a throttle opening degree sensor (a vehicle sensor) position switch 304, a kickdown switch 305, an idle switch 306, a full throttle switch 307, an oil temperature sensor 308, an input shaft revolution speed sensor (a turbine revolution speed sensor) 309, an overdrive switch 310, and an air conditioner switch 600. The outputs of these sensors and switches are supplied to the control unit 300. For example, the throttle opening degree sensor 303 detects an opening degree of the throttle valve of the engine and generates a throttle opening degree indicative signal, and the air conditioner switch 600 is turned ON to put the air conditioner in operation. The ON/OFF state of the air conditioner switch 600 is supplied to the control unit 300. The outputs of the control unit 300 are supplied to the shift solenoids 64 and 66, overrunning clutch solenoid 82, lock-up solenoid 56, and line pressure solenoid 44.

The shift valves 60 and 62 which are actuable by the corresponding shift solenoids 64 and 66, and pressure modifier valve 42 which is actuable by the line pressure solenoid 44 are controlled by the automatic transmission control unit 300.

Reference is made to pages I-22 to I-27 of the service manual (publication No. A261C07) and to the U.S. Pat. No. 4,730,521 for explanation of actuation of the solenoids 44, 64 and 66, and valves 42, 60 and 62. The necessary control functions are performed in the control unit 300.

The automatic transmission is variable in state in a predetermined pattern versus at least one predetermined parameter. For example, according to the line pressure control, the line pressure is variable in a predetermined pattern versus a throttle opening degree of a throttle valve of the engine and the hydraulically actuable couplings of the automatic transmission vary their torque transmission capacities with this varying line pressure. According to the shift control, the automatic transmission is shiftable in gear in a predetermined pattern versus the throttle opening degree and a vehicle speed. The throttle opening degree is detected by the throttle opening degree sensor 303. The output of this sensor 303 is variable with variation in the engine throttle opening degree. Since the throttle valve is operatively connected with a manually operable accelerator or gas pedal, the throttle opening degree is equal to a power demand by a driver on the engine. Since actual engine torque supplied to the automatic transmission is variable with the throttle opening degree, the line pressure control and the gear shift control employ the sensor output of the throttle opening degree sensor 303 as a parameter indicative of the amount of actually supplied torque to the automatic transmission. When an auxiliary device, such as an engine driven air conditioner, is in operation, the auxiliary device consumes engine power and reduces the amount of torque which is actually supplied to the automatic transmission. Under this condition, the output signal of the throttle opening degree sensor 303 is corrected and set as the parameter when the auxiliary device is in operation.

The manner of a self-adjustment of the automatic transmission is explained below with reference to the flow diagram shown in FIG. 5.

Figure 5:
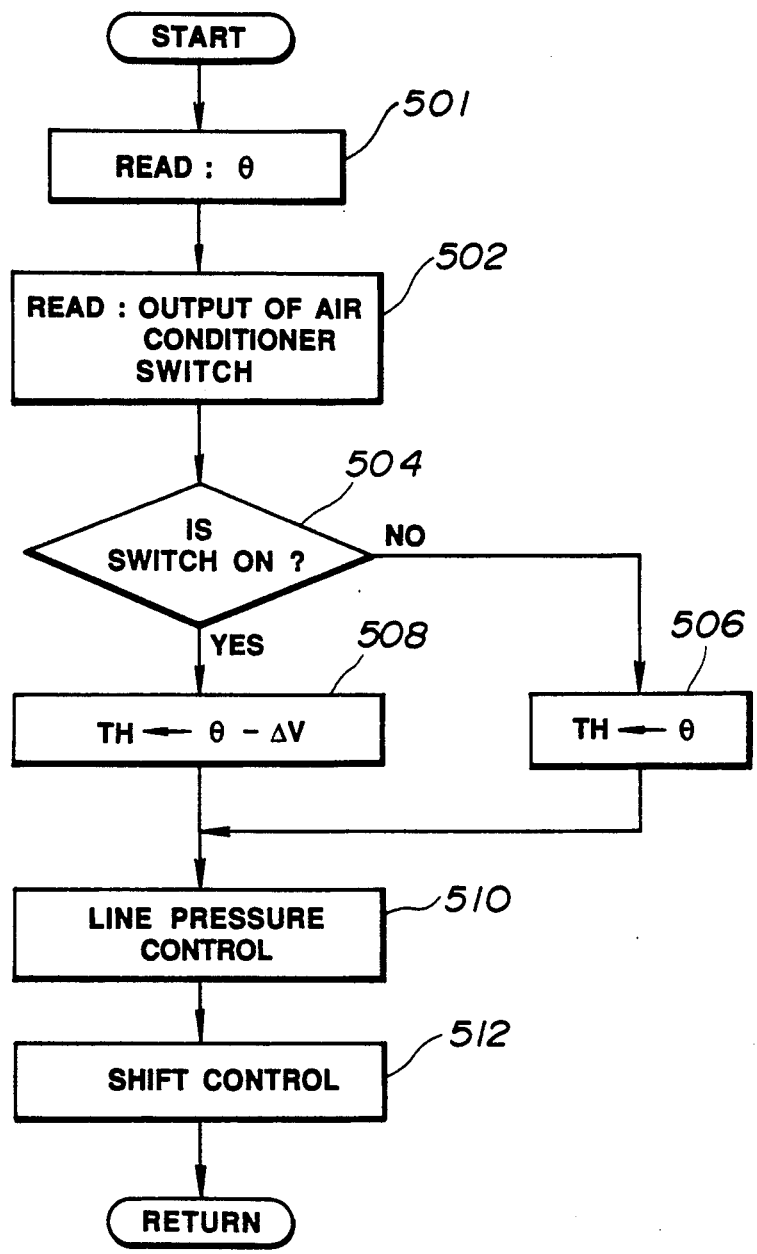
FIG. 5 a flow diagram for explaining the sequence of necessary operating steps.

In FIG. 5, at a block 501, a reading operation of output signal of the throttle opening degree sensor 303 is performed to store the result as data $\theta$. At the next block 502, a reading operation of output or state of the air conditioner switch 600 is performed to store the result in an auxiliary device in-operation register or as a flag. There is an interrogation at 504 whether the content of the auxiliary device in-operation register indicates that the air conditioner switch 600 is turned ON to put the air conditioner in operation. If this is the case, the data $\theta$ is corrected and set as a predetermined parameter TH at a block 508. Specifically, the data $\theta$ is decreased by a predetermined value $\Delta V$ (delta V). If the interrogation at 504 results in a negative, the data $\theta$ is set as the predetermined parameter TH. The line pressure control (see block 510) and the gear shift control (see block 512) are carried out on this predetermined parameter TH. Since the predetermined parameter TH correctly reflects the amount of actually supplied engine torque to the automatic transmission, the line pressure or gear shift are adjusted to closely follow the amount of actually supplied torque to the automatic transmission.

In the preceding embodiment, the air conditioner is used, but the auxiliary device may be in the form of a power steering system, a lighting device or a wiper since each of them consumes the engine power when in operation.

What is claimed is:

1. A method of an adaptive self-adjustment of an automatic transmission of an automotive vehicle, the automotive vehicle including an auxiliary device driven by an engine with a throttle valve which opens in degrees, the automatic transmission including an input shaft driven by the engine and an output shaft, the automatic transmission including hydraulically actuable and frictionally engageable couplings for transmitting torque from the input shaft to the output shaft, the method comprising the steps of:

detecting an opening degree of the throttle valve and generating a throttle opening degree indicative signal indicative of said detected opening degree;

detecting whether the auxiliary device is in operation or not and generating an auxiliary device in-operation indicative signal when it is detected that the auxiliary device is in operation;

setting said throttle opening degree indicative signal as a predetermined parameter in response to an absence of said auxiliary device in-operation indicative signal;

decreasing said throttle opening degree indicative signal to give a corrected throttle opening degree indicative signal;

setting said corrected throttle opening degree indicative signal as said predetermined parameter in response to a presence of said auxiliary device in-operation indicative signal;

carrying out a line pressure control based on said predetermined parameter such that a line pressure is adjusted to a target value which is variable in a predetermined pattern against variation in said predetermined parameter; and applying hydraulic pressure under said line pressure to at least one of the hydraulically actuable and frictionally engageable couplings.

2. In an automotive vehicle:

an engine with a throttle valve which opens in degrees;

an auxiliary device driven by said engine;

an automatic transmission including an input shaft driven by said engine and an output shaft, the automatic transmission including hydraulically actuable and frictionally engageable couplings for transmitting torque from said input shaft to said output shaft;

means for detecting an opening degree of the throttle valve and generating a throttle opening degree indicative signal indicative of said detected opening degree;

means for detecting whether said auxiliary device is in operation or not and generating an auxiliary device in-operation indicative signal when it is detected that said auxiliary device is in operation;

a control unit including:
means for setting said throttle opening degree indicative signal as a predetermined parameter in response to an absence of said auxiliary device in-operation indicative signal;

means for decreasing said throttle opening degree indicative signal to give a corrected throttle opening degree indicative signal;

means for setting said corrected throttle opening degree indicative signal as said predetermined parameter in response to a presence of said auxiliary device in-operation indicative signal; and means for carrying out a line pressure control based on said predetermined parameter such that a line pressure is adjusted to a target value which is variable in a predetermined pattern against variation in said predetermined parameter; and means for applying hydraulic pressure under said line pressure to at least one of said hydraulically actuable and frictionally engageable couplings of said automatic transmission.

3. An automotive vehicle as claimed in claim 2, wherein said auxiliary device is an air conditioner.

* * * * *